(12) United States Patent
Desnerck et al.

(10) Patent No.: US 12,114,711 B2
(45) Date of Patent: Oct. 15, 2024

(54) HEATER COMPRISING A PART MANUFACTURED BY ADDITIVE MANUFACTURING

(71) Applicant: Philip Morris Products S.A., Neuchatel (CH)

(72) Inventors: Simon Desnerck, Kortrijk (BE); Louis-Philippe Vancraeynest, Kortrijk (BE); Pieter Van Lancker, Kortrijk (BE)

(73) Assignee: Philip Morris Products S.A., Neuchatel (CH)

( * ) Notice: Subject to any disclaimer, the term of this patent is extended or adjusted under 35 U.S.C. 154(b) by 624 days.

(21) Appl. No.: 17/296,345

(22) PCT Filed: Nov. 11, 2019

(86) PCT No.: PCT/EP2019/080907
§ 371 (c)(1),
(2) Date: May 24, 2021

(87) PCT Pub. No.: WO2020/108974
PCT Pub. Date: Jun. 4, 2020

(65) Prior Publication Data
US 2022/0022555 A1 Jan. 27, 2022

(30) Foreign Application Priority Data

Nov. 28, 2018 (EP) ..................................... 18208969

(51) Int. Cl.
*A24F 40/70* (2020.01)
*A24F 40/20* (2020.01)
(Continued)

(52) U.S. Cl.
CPC .............. *A24F 40/70* (2020.01); *A24F 40/20* (2020.01); *A24F 40/46* (2020.01); *B29C 64/30* (2017.08);
(Continued)

(58) Field of Classification Search
CPC .......... A24F 40/70; A24F 40/46; A24F 40/20; B33Y 10/00; B33Y 80/00; B33Y 40/20;
(Continued)

(56) References Cited

U.S. PATENT DOCUMENTS 5,322,075 A     6/1994  Deevi et al.
9,357,803 B2 *  6/2016  Egoyants .............. F16L 59/065
(Continued)

FOREIGN PATENT DOCUMENTS

CA        2781198 A1 *  6/2011 ............. A24B 15/16
CN      104207333 A     12/2014
(Continued)

OTHER PUBLICATIONS

International Search Report and Written Opinion mailed on Jan. 8, 2020 in PCT/EP2019/080907 filed on Nov. 11, 2019.
(Continued)

*Primary Examiner* — Peter G Leigh
(74) *Attorney, Agent, or Firm* — Oblon, McClelland, Maier & Neustadt, L.L.P.

(57) ABSTRACT

A method of manufacturing a heater for an aerosol-generating device is provided, the method including: forming a heater body including a heater body frame and a heating element, the heater body defining at least a portion of a boundary of a heating chamber configured to receive an aerosol-generating article such that the heating element is configured to heat the heating chamber, at least part of the heater body frame being manufactured by additive manufacturing. A method of manufacturing an aerosol-generating (Continued)

device; and a heater; and an aerosol-generating device are also provided.

17 Claims, 3 Drawing Sheets

(51) Int. Cl.
    *A24F 40/46*     (2020.01)
    *B29C 64/30*     (2017.01)
    *B33Y 10/00*     (2015.01)
    *B33Y 40/20*     (2020.01)
    *B33Y 80/00*     (2015.01)
    *H05B 3/06*     (2006.01)
    *B29L 31/00*     (2006.01)

(52) U.S. Cl.
    CPC ............... *B33Y 10/00* (2014.12); *B33Y 40/20* (2020.01); *B33Y 80/00* (2014.12); *H05B 3/06* (2013.01); *B29L 2031/7414* (2013.01); *B29L 2031/779* (2013.01); *H05B 2203/017* (2013.01)

(58) Field of Classification Search
    CPC .... B29C 64/30; H05B 3/06; H05B 2203/017; B29L 2031/7414; B29L 2031/779
    USPC .................................................. 131/329, 328
    See application file for complete search history.

(56) References Cited

U.S. PATENT DOCUMENTS

| | | |
|---|---|---|
| 9,517,128 B2 | 12/2016 | McAlpine et al. |
| 2011/0126848 A1 | 6/2011 | Zuber et al. |
| 2015/0223522 A1* | 8/2015 | Ampolini ............. A61M 11/042 324/750.01 |
| 2015/0272226 A1 | 10/2015 | Zuber et al. |
| 2016/0007474 A1 | 1/2016 | Dardona et al. |
| 2016/0174613 A1 | 6/2016 | Zuber et al. |
| 2017/0023312 A1 | 1/2017 | Urbanski |
| 2017/0092556 A1 | 3/2017 | Gustafson |
| 2017/0367407 A1 | 12/2017 | Althorpe et al. |
| 2018/0045471 A1 | 2/2018 | Dietrich |
| 2018/0049478 A1* | 2/2018 | Ampolini ................. A24F 40/50 |
| 2018/0266685 A1 | 9/2018 | Fisten et al. |
| 2018/0281279 A1 | 10/2018 | Barocio et al. |
| 2019/0166909 A1 | 6/2019 | Reevell |

FOREIGN PATENT DOCUMENTS

| | | | | |
|---|---|---|---|---|
| CN | 204483027 U | | 7/2015 | |
| EP | 0503767 B1 | * | 5/1995 | ............. A24F 40/20 |
| EP | 2110033 A1 | * | 10/2009 | ........... A24F 47/008 |
| EP | 2 316 286 A1 | | 5/2011 | |
| EP | 3 061 545 A1 | | 8/2016 | |
| EP | 3 061 546 A1 | | 8/2016 | |
| EP | 2955974 A4 | * | 11/2016 | ............... H05B 3/06 |
| EP | 3 266 323 A1 | | 1/2018 | |
| JP | 2013-509160 A | | 3/2013 | |
| RU | 2608277 C2 | | 1/2017 | |
| RU | 2638514 C2 | | 12/2017 | |
| RU | 2656823 C2 | | 6/2018 | |
| WO | WO-9527412 A1 | * | 10/1995 | ........... A24F 47/008 |
| WO | WO 2017/013164 A1 | | 1/2017 | |
| WO | WO-2017162691 A1 | * | 9/2017 | ........... A24B 15/167 |
| WO | WO 2017/180163 A1 | | 10/2017 | |
| WO | WO 2017/180169 A1 | | 10/2017 | |
| WO | WO 2017/186455 A1 | | 11/2017 | |
| WO | WO 2018/077612 A1 | | 5/2018 | |
| WO | WO 2018/094641 A1 | | 5/2018 | |
| WO | WO 2018/138072 A1 | | 8/2018 | |
| WO | WO 2018/167166 A1 | | 9/2018 | |

OTHER PUBLICATIONS thingiverse.com, "Pulse-x 90W by rcummings444—Thingiverse", Oct. 21, 2018, XP055654487, Retrieved from the Internet: URL: https://www.thingiverse.com/thing:3168195; [retrieved on Dec. 20, 2019] , 2 pages.
Russian Search Report Issued Apr. 6, 2023 in Russian Application No. 2021115116, (with English translation), 6 pages.
Russian Office Action issued Apr. 6, 2023 in Russian Application 2021115116, (with English translation), 15 pages.
Yonggang Yao, et al., "Three-Dimensional Printable High-Temperature and High-Rate Heaters" ACS Nano, 2016, pp. 5272-5279.
Extended European Search Report issued Jun. 11, 2019 in European Patent Application No. 18208969.8, 11 pages.
International Preliminary Report on Patentability issued Mar. 16, 2021 in PCT/EP2019/080907, 9 pages.
Swapnil Sinha, "Improving Quality of Multi-Functional Structures Created Via Material Extrusion Additive Manufacturing," The Pennsylvania State University, May 2017, 69 pages.
"Heat Exchanger," Autodesk Within, 2015, 2 pages.
Japanese Office Action issued Dec. 4, 2023 in Japanese Patent Application No. 2021-525064 (with English Translation), 14 pages.
European Office Action issued Nov. 13, 2023 in European Patent Application No. 19 798 117.8, 5 pages.

* cited by examiner

HEATER COMPRISING A PART MANUFACTURED BY ADDITIVE MANUFACTURING

The invention relates to heaters for an aerosol-generating device and to methods for manufacturing such heaters. More particularly, the invention belongs to the field of external heaters.

External heaters comprise a heating chamber in which an aerosol-generating article, such as a tobacco article, is inserted. When the heater generates heat, thus heating the heating chamber, the aerosol-generating article is heated to a temperature where a heated aerosol is released and can be inhaled by a consumer. The aerosol may contain aromas, flavours, nicotine and other desired elements.

These heaters are used in aerosol-generating devices. The devices are usually compact so that they can fit in the consumer's pocket or bag, and they may comprise a power source, such as a battery, in order to provide electrical power to the heater. Hence, the heaters must be efficiently designed so as to be housed within the aerosol-generating device while being able to provide the required heat to the aerosol-generating article for as much time as possible, preferably with a single charge of the power source.

However, designing and manufacturing an efficient heater can be very complex, which increases the costs of the heater and the aerosol-generating device. Besides, once a given model of heater has been marketed, the cost and risk that providing a new type of heater would suppose usually result in less efficient models remaining on the market for a longer time.

It would therefore be desirable to provide a method of manufacturing external heaters in which there is greater flexibility in the likes of design, shape and materials that can be chosen for making the heater without necessarily leading to an increase of the production costs.

According to a first aspect of the present invention, a method of manufacturing a heater for an aerosol-generating device that aims at minimising the above drawbacks is provided.

This method comprises: forming a heater body which comprises a heater body frame and a heating element, the heater body defining at least portion of a boundary of a heating chamber for receiving an aerosol-generating article such that the heating element is suitable for heating the heating chamber, wherein at least part of the heater body is manufactured by additive manufacturing.

The expression "additive manufacturing" is used to refer to a manufacturing technique that is employed to sequentially deposit material to form a three-dimensional item layer by layer under computer control. This expression is typically used, in particular, to refer to three-dimensional printing (3D printing), which is the process whereby a series of layers of a material are laid down in much the same way as an inkjet printer would lay down ink, in which multiple passes of a print head will build the item. However, it shall be appreciated that a wider variety of modified additive manufacturing processes is available, including processes based on extrusion and sintering, and the expression "additive manufacturing" shall be construed as also encompassing such alternative techniques, even if, in the present application, it is particularly preferable for the additive manufacturing to be in the form of 3D printing.

The part of the heating element or part of the heater body frame manufactured by additive manufacturing may have complex shapes.

The part of the heating element or part of the heater body frame manufactured by additive manufacturing may be made up of a wide range of materials while keeping the costs of manufacture low.

Using additive manufacturing to manufacture at least part of the heater body may advantageously facilitate the formation of more efficient heaters in which the transfer of heat between the heater and the aerosol-generating article is optimized. Using additive manufacturing may also advantageously keep the costs of manufacture of at least part of the heater body low. Likewise, the method of the first aspect of the invention may be more versatile than other methods since design changes can be made more easily with additive manufacturing. For example, no new dedicated tooling or other production rearrangement are normally needed. This may allow for a limited release of certain heater designs without concern of major restructuring of tooling or other production arrangements. The resulting heaters can also be more compact and can comprise a variety of decorative features.

The step of forming the heater body may comprise manufacturing the heating element by manufacturing a heat generating layer using additive manufacturing, the heat generating layer defining a cavity delimited by an inner cavity wall and a cavity opening, so that the portion of the boundary of the heating chamber for receiving the aerosol-generating article is defined by the inner cavity wall and the cavity opening.

This arrangement is advantageous since the part of the heater body manufactured by additive manufacturing is a layer that constitutes the heating element itself. Such a heat generating layer can take advantage of the versatility of additive manufacturing for providing a heating chamber, defined by the inner cavity wall and cavity opening, in which a more efficient transfer of heat is achieved.

The shape of the heat generating layer may be such that the portion of the boundary of the heating chamber for receiving the aerosol-generating article has an undercut shape.

In this specification, the term "undercut shape" is used to generally indicate a chamber which has an overhang defined about its opening. Put another way, the chamber is shaped such that, if the chamber were to be completely filled with solid rigid material, then an attempt to remove the solid rigid material from the chamber through the opening would result in resistance, due to engagement between a portion of the solid material and a corresponding overhanging portion of the chamber. An example for an undercut recess is the female part of two mating puzzle pieces.

Undercut shaped heating chambers may provide a different (and in some circumstances preferable) arrangement to non-undercut shaped heating chambers. For example, an undercut shaped heating chamber may provide for a higher level of heating to a select portion or portions of an article disposed within the chamber. In contrast, a non-undercut heating chamber may only provide for a homogenous heating of the article. Despite such potential benefits, an undercut shaped heating chamber may not be one that is considered in conventional aerosol-generating devices, because they may be difficult to manufacture with conventional techniques.

The part of the heating element or part of the heater body frame manufactured by additive manufacturing may have other complex shapes such as a tube shape, a cup shape, an extruded profile, a complex organic shape, a combination of multiple geometric entities, a tube with a textured surface, a clamp, a mesh like structure, a grid like structure, a curved surface, or any other shape. These shapes may also not be considered in conventional aerosol-generating devices, because they may present significant engineering challenges if manufactured with conventional techniques.

The step of forming the heater body may further comprise the provision of a heat conductive layer on the inner cavity wall. With such an arrangement, the heat conductive layer provides an intermediate layer between the heat generating layer and the aerosol-generating article, when the article is within the heating chamber. This may be useful to achieve a more homogeneous heat distribution.

The step of forming the heater body may also comprise the provision of an insulating layer on the side of the heat generating layer opposite the inner cavity wall, that is, the side which is closer to an external surface of the heater. This can help to reduce the amount of heat which may reach the external surface of the heater and also an outer surface of the aerosol-generating device when the heater is installed in the aerosol-generating device. This may reduce the risk of discomfort for the user.

The step of forming the heater body may comprise providing the heater body frame and manufacturing at least part of the heating element directly on the heater body frame by additive manufacturing. In other words, the layers that form the heating element by additive manufacturing may be deposited on a surface of the heater body frame, without an intermediate part or manufacturing step.

The heater body frame can in turn be manufactured by additive manufacturing or by any other method. Once the heater body frame is provided, additive manufacturing may be used to manufacture the heating element on the surface of the heater body frame. The heater body frame may define the portion of the boundary of the heating chamber and additive manufacturing is advantageously used to provide the heating element within such heating chamber with the shape and material that usually endow the heating chamber with a better heat transfer.

The step of forming the heater body may comprise manufacturing the heater body frame by additive manufacturing. By using this technique for this particular component of the heater, more complex and efficient heaters can also be made without requiring expensive solutions. The heater body frame may define the portion of the boundary of the heating chamber.

The heating element may be directly coupled to the heater body frame manufactured by additive manufacturing. The advantage of this solution is that the flexibility in the design of the heater body frame permits adapting its shape and materials to the heating element to be coupled to such body frame.

As used herein, the term "directly coupled" should be understood to mean that the heating element is coupled to the heater body frame without any intermediate part between them.

The heating element may comprise a resistive structure. The resistive structure may be one or more of a resistive coating, a resistive plate or a resistive coil. The resistive structure may be directly coupled to the heater body frame manufactured by additive manufacturing.

The heater body frame manufactured by additive manufacture may be coupled to the heating element in such a way that they are in thermal contact when the heating element generates heat, thus providing heat dissipation to evacuate heat from the heating element and transfer it to other regions of the heater body or towards the outside of the heater. Heat evacuated from the heating element may for example be transferred to a battery when the heater is installed in an aerosol-generating device comprising a battery. The battery may therefore be kept at a desirable operating temperature. Since additive manufacturing normally allows for an optimization of the shape and material to provide, among other advantages, better heat transfer, the heater body frame can be accurately designed and manufactured to provide better heat dissipation for the heating element.

The entire heater body frame may be manufactured by additive manufacturing. As a result, the external part of the heater can also include complex, optimised shapes. These optimised shapes may help to permit a better fitting of the heater within the aerosol-generating device, an improved external appearance, or both.

The heater body frame may form an air channel having an air inlet and an air outlet, the air outlet being designed to allow heated aerosol to leave the heating chamber. The air channel normally defines at least portion of the boundary of the heating chamber for receiving the aerosol-generating article, and the heating element is provided to heat the flow of air that goes through the air channel from the air inlet to the air outlet, thus heating the aerosol-generating article when the latter is within the heating chamber. In addition to this, or alternatively, the heating element can be provided to be in direct contact with the aerosol-generating article. By using additive manufacturing, optimised air channels and/or heating elements can be achieved, enhancing the heat transfer properties of conventional heaters comprising air channels.

The heating element may comprise a heat generating layer provided within the air channel and manufactured by additive manufacturing. Advantageously, this may allow the heat generating layer to be adapted to the dimension of the air channel to provide better heat transfer without significant restrictions in its shape and materials.

The heating element may comprise a static heating structure manufactured by additive manufacturing and provided within the air channel.

Static heating structures can be beneficial in that they can improve the heat transfer between the heating element and the air within the air channel. This may be achieved by one or more of mixing or stirring the air or by means of turbulence. For example, the static heating structure may be shaped for—or include features which promote—mixing air within the air channel. Such an improvement may be enhanced by the use of additive manufacturing, as this may reduce the constraints in the manufacturing of the static heating structures. Protrusions extending from an inner wall of the air channel are an example of convenient static heating structures that can be manufactured by additive manufacturing. Examples of other static heating structures include—but are not limited to—tunnels, recesses, dips, or combinations thereof. Where the heating element comprises a plurality of static heating structures, the static heating structures may be connected to one another.

A static heating structure is a heating structure which is not configured to move relative to the rest of the heating element during use.

Additive manufacturing can be advantageously used to manufacture further parts of the heater body. For example the heater body may comprise one or more sensors formed by additive manufacturing. Other examples of parts of the heater body that can be manufactured by additive manufacturing are a heat exchanger, a heat diffuser, a heat reflector, an insulator and a housing.

The sensors can be used to determine the temperature within the heating chamber so as to adapt the heat transfer rate from the heating element to the heating chamber.

Additive manufacturing provides an inexpensive and versatile way to provide sensors in the appropriate regions of the heating chamber. The sensors can first be manufactured by additive manufacturing and then assembled with the rest of the heater body. The sensors may be manufactured by additive manufacturing directly on the corresponding part of the heater body. The sensors may be manufactured by additive manufacturing in the same manufacturing step as other part of the heater body.

The reduction of constraints resulting from the use of additive manufacturing enables the part of the heater body manufactured by additive manufacturing to be subjected to additional processing steps if desired. For example, such part can be drilled, milled, sanded, cut, coated, sawn, and so forth.

Likewise, the part or parts of the heater body manufactured by additive manufacturing can be configured to move in relation to other parts by means of hinging, sliding, turning, flexing, bending, folding, and so forth.

The part of the heater body manufactured by additive manufacturing may be obtained by making a cast mould using additive manufacturing and then casting the part of the heater body by means of the cast mould. Accordingly, more complex cast moulds can be manufactured, which in turn will give rise to casting the part of the heater body with a higher choice of shapes than in the case in which a conventional cast mould has been employed. The casting process may be performed using lost wax casting or any other suitable casting process.

The part of the heater body manufactured by additive manufacturing may comprise at least one of the following polymers: PLA (polylactic acid), ABS (acrylonitrile butadiene styrene), PET (polyethylene terephthalate), Nylon (polyamide), TPU (thermoplastic polyurethane), PEEK (polyether ether ketone), Polypropylene, Acrylic material, ASA (acrylonitrile styrene acrylate), Polycarbonate, HIPS (high impact polystyrene), Polyoxymethylene, Polyvinyl Alcohol. Polymers are advantageous in that they are normally an inexpensive way to provide the manufactured part with the desired properties, such as those listed in this specification.

The versatility of additive manufacturing also permits manufacturing parts combining polymers and conductive particles, such as elemental transition metal particles selected from the group consisting of silver particles, copper particles, gold particles and combinations thereof.

Other materials are also suitable for manufacturing a heater part by additive manufacturing. Some examples are metals and metals alloys, ceramic materials, carbon based materials or graphene based materials.

The materials can be chosen due to of their abilities to conduct electricity, conduct heat, generate heat under influence of a stimulus (such as electricity, light, laser, magnetic field, vibration, plasma, induction fields or microwaves), insulate heat, provide high quality visual surface finish, have good properties in terms of flexibility, strength, stiffness or hardness, have high temperature resistance, achieve chemical stability, be easily maintained or have good shape memory behaviour, among others.

When different parts of the heater, such as the heating element and the heater body frame, are made by additive manufacturing, they can be made of the same material or of different materials. The one or more materials may be selected based on the requirements of the parts. Several materials can be used even when the different parts are manufactured in the same additive printing process.

In another aspect of the invention, a method of manufacturing an aerosol-generating device is provided, the method comprising the steps of: manufacturing a heater according to any one of the embodiments detailed above, providing a power supply system in electrical contact with the heating element, providing a case and arranging the heater and the power supply system within the case.

In another aspect of the invention, a heater manufactured by any of the above methods is provided, the heater therefore comprising: a heater body which comprises a heater body frame and a heating element, the heater body defining at least portion of a boundary of a heating chamber for receiving an aerosol-generating article such that the heating element is suitable for heating the heating chamber, wherein at least part of the heater body is manufactured by additive manufacture.

In another aspect of the invention, there is provided a heater comprising: a heater body which comprises a heater body frame and a heating element, the heater body defining at least portion of a boundary of a heating chamber for receiving an aerosol-generating article such that the heating element is suitable for heating the heating chamber, wherein the portion of the boundary of the heating chamber has an undercut shape.

The heaters according to these aspects of the invention are advantageous for the same reasons as detailed above for the methods of the first aspect of the invention.

In another inventive aspect, an aerosol-generating device is provided, the aerosol-generating device comprising: any of the heaters referred to above, a power supply system in electrical contact with the heating element of the heater and a case in which the heater and the power supply system are arranged.

The advantages of such heaters are equally relevant for the aerosol-generating devices including any of these heaters.

The power supply system may comprise a control unit and electrical connections connecting the control unit to the heating element. The control unit and the electrical connections may also be made by from additive manufacturing. The control unit may comprise a printed circuit board (PCB) manufactured by additive manufacturing and the electrical circuits of the electrical connections can also be made by additive manufacturing. Advantageously, this may give rise to three-dimensional circuits or PCBs that may be appropriate for certain aerosol-generating devices.

Another inventive aspect discloses an additive manufacturing apparatus adapted to execute the step of manufacturing, by additive manufacturing, at least part of the heater body according to any one of the methods explained above; a computer program comprising instructions to cause the apparatus to execute these methods; and a computer-readable medium having stored thereon the computer program.

Computer Aided Design (CAD) is particularly useful to cooperate with additive manufacturing in the design of parts of the heater body complying with the desired requirements in properties such as: strength, heat flow, heat resistance, heat transfer, heat distribution, airflow optimisation, heat loss reduction, weight, weight distribution, material saving, contact surface optimisation, process time, aesthetic appearance, ease of assembly and so forth. Models may be created or generated to offer the best technical solutions within the range chosen for each parameter.

For this reason, an additive manufacturing apparatus adapted to execute the computer-implemented design is usually a convenient device to achieve such preferred technical solutions, and so is the computer program (or the computer medium storing the program) that allows the apparatus to carry out any of the above methods when the apparatus runs the program.

These and other features and advantages of the invention will become more evident in the light of the following detailed description of preferred embodiments, given only by way of illustrative and non-limiting example, in reference to the attached figures.

Figure 1:
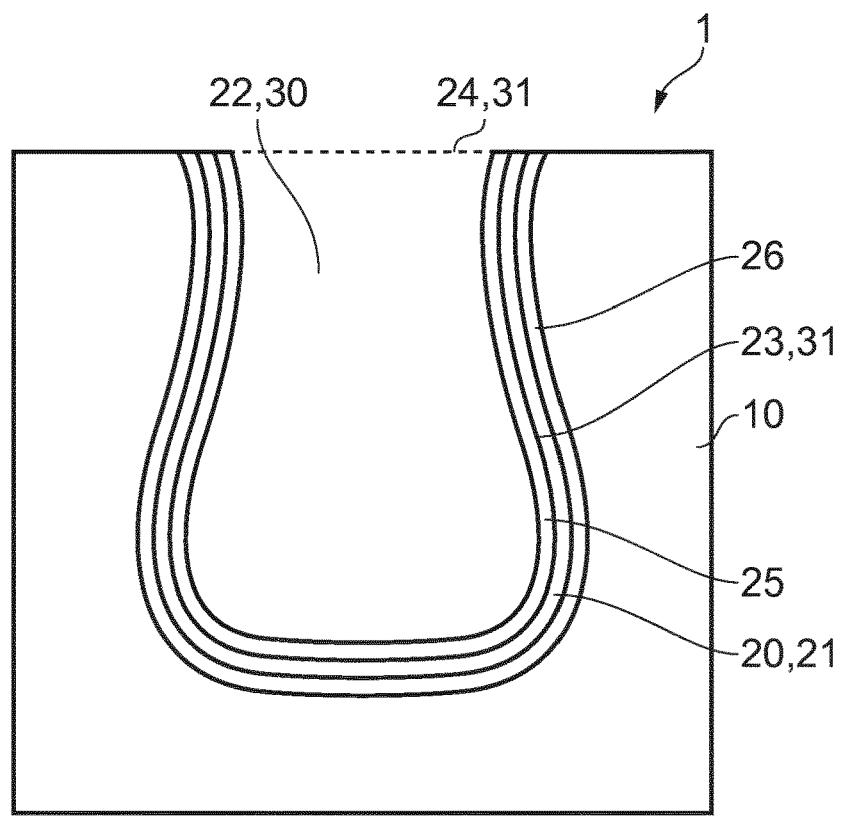
FIG. 1 depicts a heater comprising a heating element in turn having a heat generating layer manufactured by additive manufacturing.
Figure 2:
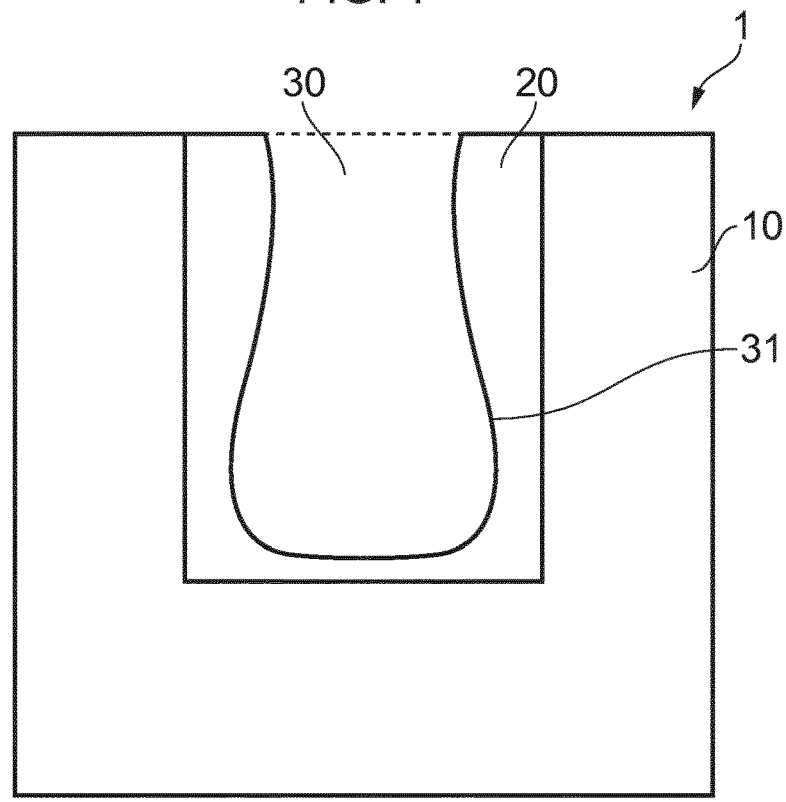
FIG. 2 illustrates a heater in which a heating element has been manufactured by additive manufacturing directly on a heater body frame.
Figure 3:
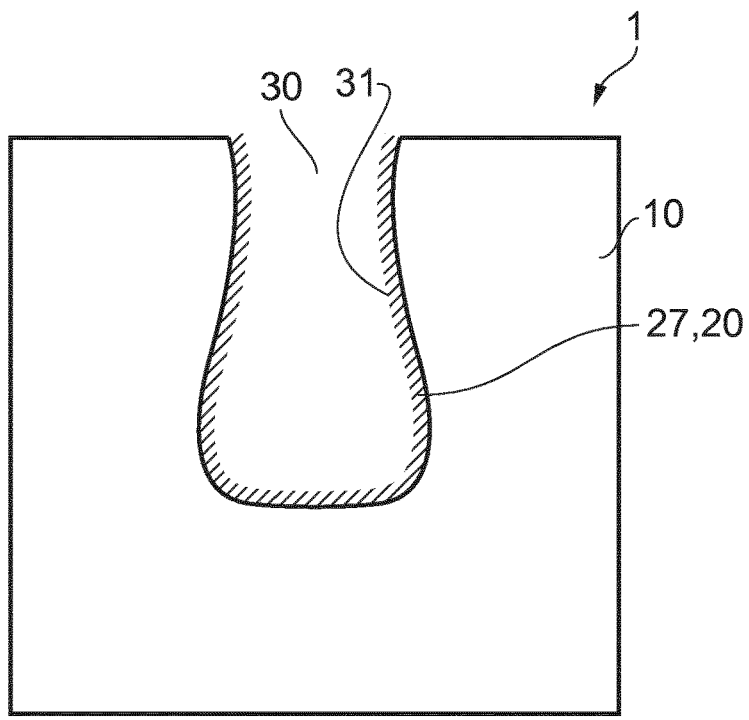

In FIG. 3, a heater having a heater body frame manufactured by additive manufactured is depicted.

Figure 4:
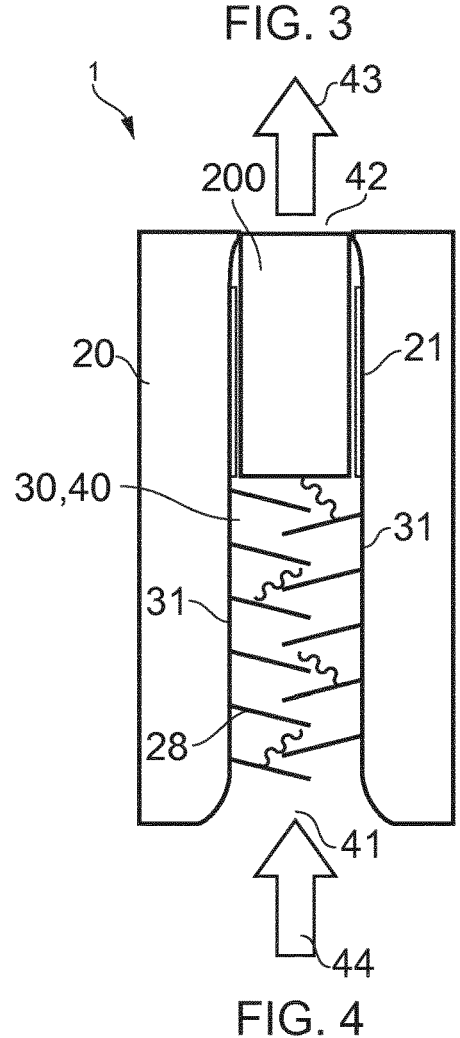

FIG. 4 shows a heater comprising an air channel and a heating element manufactured by additive manufacturing within the air channel.

Figure 5:
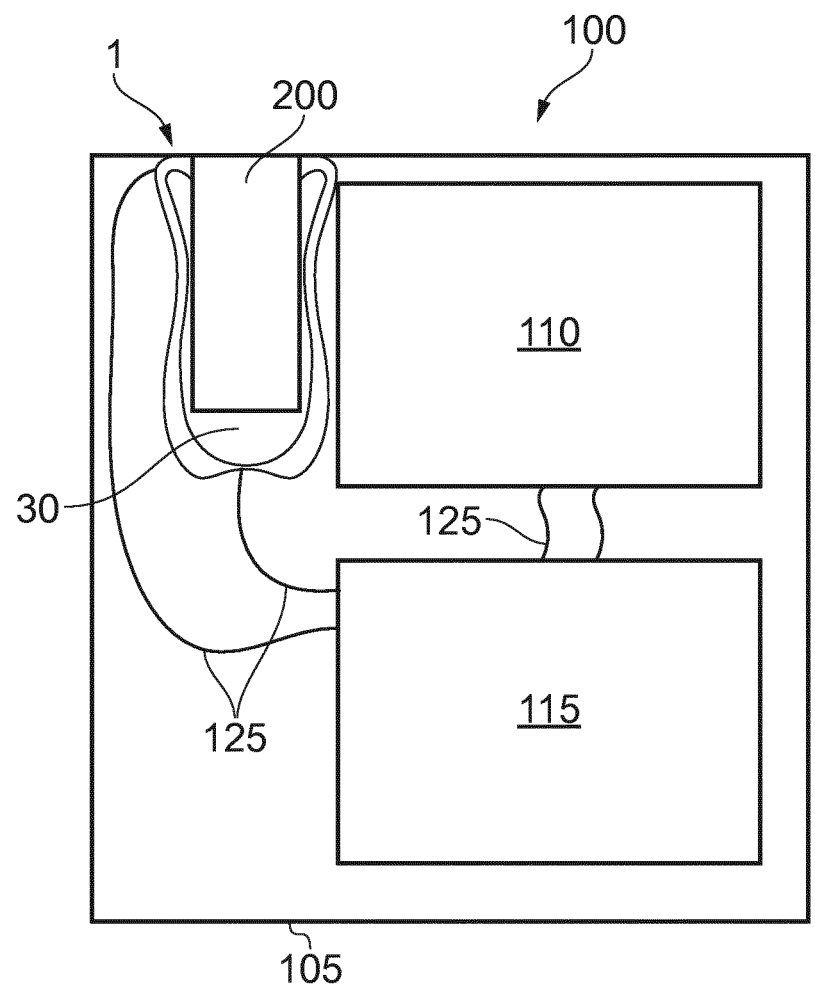

FIG. 5 represents an aerosol-generating device comprising a heater having a part manufactured by additive manufacturing, a power supply system and a case in which the heater and the power supply system are arranged.

FIG. 1 depicts a heater 1 for an aerosol-generating device 100 whose method of manufacturing comprises forming a heater body which comprises a heater body frame 10 and a heating element 20 and wherein at least part of the heater body is manufactured by additive manufacturing. The heating element 20 of FIG. 1 is made by manufacturing a heat generating layer 21 using additive manufacturing.

The heater body of the heater 1 according to the invention defines at least portion of a boundary 31 of a heating chamber 30 for receiving an aerosol-generating article 200. The heating element 20 is configured to heat the heating chamber 30 when the heater 1 is in use so as to transfer heat to the aerosol-generating article 200 when the latter is within the heating chamber 30.

In the embodiment of FIG. 1, it is the heat generating layer 21 that defines such portion of the boundary 31. More particularly, the heat generating layer 21 creates, once it has been manufactured by additive manufacturing, a cavity 22 delimited by an inner cavity wall 23 and a cavity opening 24, such that the portion of the boundary 31 is defined by the inner cavity wall 23 and the cavity opening 24.

The resulting heating chamber 30 is not subjected to the manufacturing restrictions that normally reduces the efficiency or increases the cost in most heater bodies of the prior art. As is represented in FIG. 1, the shape of the portion of the boundary 31 of the heating chamber has an undercut shape in order to improve the transfer of heat within the heating chamber 30—such shape is an example of the flexibility of the method of the invention to create efficient heaters.

The method of FIG. 1 further comprises the provision of a heat conductive layer 25 on the inner cavity wall 23 and of an insulating layer 26 on the opposite side of the heat generating layer 21.

In the embodiment of FIG. 1, since the heat generating layer 21 is manufactured by additive manufacturing, this layer is used to define an undercut shape or any other complex efficient shape, so that the heater body frame 10 and, in some embodiments, the heat conductive layer 25 and the insulating layer 26 can be provided around the heat generating layer 21, adapting to its shape.

In the embodiment of FIG. 2, a heater body frame 10 is provided by any method. Additive manufacturing is advantageously used to directly manufacture, on a given surface of the heater body frame 10, a heating element 20 having the shape that is the most convenient for the thermal and design needs of the heater 1 in question. As an example, FIG. 2 depicts a heating element 20 defining a portion of the boundary 31 of a heating chamber 30 which has an undercut shape.

Likewise, in the embodiment of FIG. 3, it is the heater body frame 10 that is manufactured by additive manufacturing in order to give rise to an efficient heater 1. The heating element 20 might be directly coupled to a surface of the heater body frame 10, for example by providing a resistive coating 27 on such surface, as is depicted in FIG. 3 in dashed lines. Since the surface of the heater body frame 10 already has the shape chosen to achieve a better efficiency in terms of heat transfer or any other properties, the resistive coating 27 is a particularly suitable solution to easily provide a heating element without altering the efficient shape given by the heater body frame 10. The boundary 31 of the heating chamber 30 is delimited by the resistive coating 27 following the shape of the heater body frame 10. The entire heater body frame 10 can be manufactured by additive manufacturing or, alternatively, only the part that defines the shape of the heating chamber 30 may be manufactured by additive manufacturing.

The efficient heater body frame 10 of FIG. 3 might be designed to provide optimal heat dissipation from the heating element 20, by choosing the appropriate shape and materials for the additive manufacturing. For instance, the design may be configured to transfer heat from the heating element 20 to the outside of the heater 1 or to the area of the heater intended for being closer to a battery when the heater 1 is installed in an aerosol-generating device (see FIG. 5), so that the battery is kept at a desirable operating temperature.

In the embodiment of FIG. 4, the heater body frame 10 forms an air channel 40 having an air inlet 41 and an air outlet 42, the air outlet 42 being designed to allow heated aerosol 43 to leave the heating chamber 30. At least a portion of the boundary 31 of the heating chamber 30 is defined in this embodiment by inner walls of the heater body frame 10 that constitute the inner channel 40. That is, the air channel 40 forms, at least partially, the heating chamber 30.

In the depicted embodiment, additive manufacturing is employed to provide a heating element 20 comprising a heat generating layer 21 within the air channel 40. As an example, the heat generating layer 21 can be attached to the inner wall of the heater body frame 10. In the embodiment represented in FIG. 4, the heating element 20 further has a static heating structure 28 also manufactured by additive manufacturing. The static heating structure 28 of this example comprises fin-shaped protrusions, for which the precise shape, orientation, and offset is selected to provide optimum heat transfer. The fin-shaped protrusions are manufactured by additive manufacturing. This technique could also be used to manufacture additional parts of the heating element 20, such as dips or heat tunnels. The protrusions and any other heating element parts can be, in an embodiment, connected to each other.

In order to illustrate more clearly how the heater of FIG. 4 works, an aerosol-generating article 200 is depicted within the heating chamber 30. Fresh air 44 enters the air channel 40 through the air inlet 41 and is heated, mixed and stirred by the static heating structure 28 while guided towards the aerosol-generating article 22. The heat generating layer 21 supplies additional heat into the heating chamber 30, concretely to the region wherein the aerosol-generating article 200 is housed. The aerosol-generating article produces a heated aerosol 43 that mixes with the heated air flowing along the air channel 40 and leaves the air channel 40 through the air outlet 42.

FIG. 5 shows an aerosol-generating device 100 comprising a heater 1 manufactured according to any one of the above embodiments. An aerosol-generating article 200 is housed within the heating chamber 30 of the heater 1. When in use, a power supply system in electrical contact with the heating element 20 of the heater 1 provides energy to the heating element 20, which transfers heat to the aerosol-generating article 200 to produce the inhalable heated aerosol 43.

The power supply system of FIG. 5 comprises a battery 110, a control unit 115 and electrical connections 125 connecting the battery 110 and the control unit 115 with the heating element 20. The control unit 115 regulates the supply of electrical energy from the battery 110 to the heating element 20, so that the heating element 20 transfers heat to the heating chamber 30 when the aerosol-generating article is within the chamber and heat is needed to obtain the heated aerosol 43.

The control unit 115 and the electrical connections 125 may also benefit from additive manufacturing. As an example, the control unit 115 may comprise a printed circuit board (PCB) manufactured by additive manufacturing and the electrical circuits of the electrical connections can also be made by additive manufacturing. Advantageously, this can give rise to three-dimensional circuits or PCBs that can be adequate for certain aerosol-generating devices.

A case 105 houses the heater 1, the control unit 115, the battery 110 and the electrical connections 125, forming the external cover of the aerosol-generating device 100.

The invention claimed is:

1. A method of manufacturing a heater for an aerosol-generating device, the method comprising:
    forming a heater body comprising a heater body frame and a heating element, the heater body defining at least a portion of a boundary of a heating chamber configured to receive an aerosol-generating article such that the heating element is configured to heat the heating chamber,
    wherein at least part of the heater body frame is manufactured by additive manufacturing.

2. The method of claim 1, wherein the step of forming the heater body further comprises manufacturing the heating element by manufacturing a heat generating layer using additive manufacturing, the heat generating layer defining a cavity delimited by an inner cavity wall and a cavity opening, so that the portion of the boundary of the heating chamber configured to receive the aerosol-generating article is defined by the inner cavity wall and the cavity opening.

3. The method of claim 2, wherein the step of forming the heater body further comprises providing a heat conductive layer on the inner cavity wall.

4. The method of claim 2, wherein the step of forming the heater body further comprises providing an insulating layer on a side of the heat generating layer opposite the inner cavity wall.

5. The method of claim 1, wherein the step of forming the heater body further comprises manufacturing at least part of the heater body frame by additive manufacturing and manufacturing at least part of the heating element directly on the heater body frame by additive manufacturing.

6. The method of claim 1, wherein the heater body frame forms an air channel having an air inlet and an air outlet, the air outlet being configured to allow heated aerosol to leave the heating chamber.

7. The method of claim 6, wherein the heating element comprises a heat generating layer provided within the air channel and manufactured by additive manufacturing.

8. The method of claim 7, wherein the heating element comprises a static heating structure manufactured by additive manufacturing and provided within the air channel.

9. The method of claim 8, wherein the static heating structure comprises protrusions extending from an inner wall of the air channel.

10. The method of claim 6, wherein the heating element comprises a static heating structure manufactured by additive manufacturing and provided within the air channel.

11. The method of claim 10, wherein the static heating structure comprises protrusions extending from an inner wall of the air channel.

12. The method of claim 1, wherein the portion of the boundary of the heating chamber configured to receive the aerosol-generating article has an undercut shape.

13. A method of manufacturing an aerosol-generating device, comprising:
    manufacturing a heater according to claim 1;
    providing a power supply system in electrical contact with the heating element; and
    providing a case and arranging the heater and the power supply system within the case.

14. A heater manufactured according to claim 1, the heater comprising:
    a heater body comprising a heater body frame and a heating element, the heater body defining at least portion of a boundary of a heating chamber configured to receive an aerosol-generating article such that the heating element is configured to heat the heating chamber,
    wherein at least part of the heater body frame is manufactured by additive manufacture.

15. The heater of claim 14, wherein the portion of the boundary of the heating chamber has an undercut shape.

16. An aerosol-generating device, comprising:
    the heater of claim 14;
    a power supply system in electrical contact with the heating element of the heater; and
    a case in which the heater and the power supply system are arranged.

17. A nontransitory computer-readable storage medium having a computer program thereon that when executed on electrical circuitry of an apparatus, causes the apparatus to perform the step of manufacturing, by additive manufacturing, at least part of the heater body frame according to claim 1.

* * * * *